Jan. 14, 1936. W. N. ALLYN 2,027,663
OPHTHALMOSCOPE
Filed Oct. 20, 1933
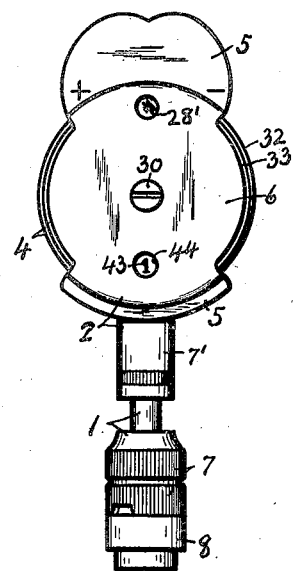
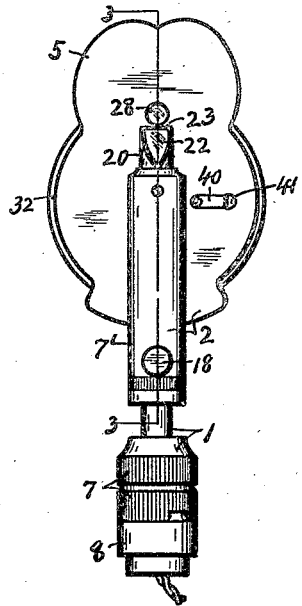
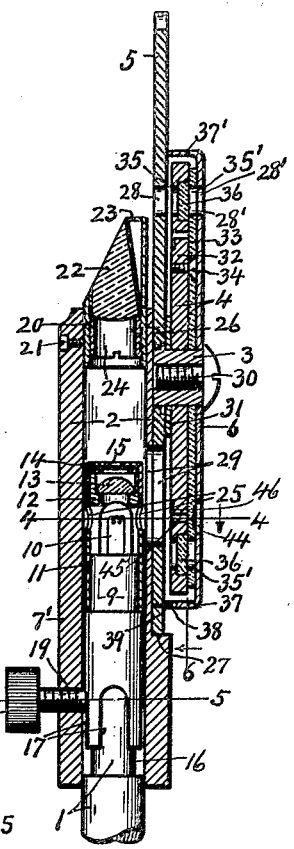
INVENTOR
W. N. Allyn
BY
Denison & Thompson
ATTORNEYS
WITNESS
J. J. Mains Patented Jan. 14, 1936

2,027,663

UNITED STATES PATENT OFFICE 2,027,663

OPHTHALMOSCOPE

William N. Allyn, Auburn, N. Y.

Application October 20, 1933, Serial No. 694,426

10 Claims. (Cl. 88—22)

This invention relates to certain improvements in ophthalmoscopes of the class set forth in my Patent No. 1,516,133, November 18th, 1924, and also in my Patent No. 1,981,214, November 20, 1934, in which a rotary lens carrier is provided with a multiplicity of lenses of different power arranged about its axis for individual registration with a suitable sight opening in the main supporting frame as the carrier is rotated, said carrier being also provided with a corresponding number of indexes, one for each lens, adapted to be brought into registration with a second sight opening in the frame through such rotation to enable the operator to selectively present the desired lens to the first sight opening.

The indexes for the several lenses and the sight opening through which they are exposed one at a time are necessarily of relatively small size and while it is true that the shutter plate covering all of the indexes except that which is exposed through the sight opening is made as thin as possible, the visibility of the exposed index through the sight opening, particularly in darkened rooms, often becomes obscured by shadows or darkness to such an extent as to render the indexes invisible.

These instruments are also provided with relatively small but powerful lamps and suitable projection lenses for directing the rays of light from the lamp to the eye or other part under examination, and the main object of the present invention is to provide means whereby the rays from the source of light may be directed to the particular index on the carrier which is exposed through its sight opening and thereby to greatly increase the visibility of the indexes as they are brought into registration with said opening irrespective of the darkness or shadows.

Other objects and uses relating to specific parts of the illuminating means will be brought out in the following description.

In the drawing:—

Figures 1 and 2 are respectively obverse and reverse face views of an ophthalmoscope, embodying the various features of my invention, the battery handle commonly used, being omitted.

Figure 3 is an enlarged vertical sectional view taken on line 3—3, Figure 2.

Figures 4 and 5 are horizontal sectional views taken respectively in the planes of lines 4—4 and 5—5, Figure 3.

Figure 6 is a fragmentary sectional view taken in the plane of line 6—6, Figure 3, showing more particularly the relation of the two discs of the rotary carrier.

Figure 7 is a perspective view of the lamp-supporting spindle and lamp shield detached one from the other.

Figure 8 is a face view of a portion of a modified form of my invention similar to Figure 1 in which the rays of light from the lamp are directed to the registering index through the medium of a reflector.

Figure 9 is an enlarged detail sectional view taken on line 9—9, Figure 8.

The preferred form of my invention shown in Figures 1 to 7 inclusive comprises a lamp-supporting spindle 1 and a suitable frame 2 having a boss or journal bearing 3 upon which is mounted a rotary lens carrier or disk 4 and relatively stationary plates 5 and 6.

The spindle 1 has its lower end provided with a coupling member 7 rigid therewith and detachably coupled to another coupling member 8 which latter may be secured to the top of the battery handle or connected to any other source of electric supply in the manner somewhat as shown and described in the patent previously referred to and also in my pending application, it being understood that when the battery handle is employed it will be provided with a suitable rheostat switch for opening and closing the lamp circuit and for varying the intensity of the light as may be desired.

The upper end of the spindle forms a lamp socket 9 into which is fitted a small electric lamp 10, said socket and lamp being quite similar to that shown in my pending application referred to.

A thin metal ferrule or shield 11 is telescopically fitted over and upon the periphery of the lamp socket 9 to extend upwardly some distance above the upper end of the lamp 10 for receiving and supporting a tubular lens mounting 12 in which is secured a relatively small condenser lens 13 co-axial with the lamp socket and just above the upper end of the lamp.

A thin metal cap section 14 is telescopically fitted over and upon the tubular mounting 12 to abut against the upper end of the ferrule 11 and is provided with a central opening 15 registering with a similar but somewhat larger central opening in the top of the lens mounting to allow the rays of light from the lamp to pass therethrough after passing through the lens 13.

The frame 2 preferably comprises a tubular head 1' which is mounted upon the spindle for axial adjustment and to which the plates 5 and 6 are secured in a manner hereinafter described.

The lamp-supporting spindle 1 is provided intermediate its ends with an annular groove 16 and a plurality of, in this instance four, lengthwise peripheral grooves 17 extending upwardly from the annular groove for receiving a set screw 18 which is engaged in a threaded opening 19 in the tubular head 7'.

A second tubular lens mounting 20 is removably secured in the upper end of the tubular head 7' by means of a set screw 21 for receiving and supporting a projecting lens 22, said mounting being extended upwardly and forwardly at 23 over the upper edge of the lens 22 to hold the latter in the mounting against upward displacement, said lens being held against undue inward movement by means of an internal tubular nut 24 in threaded engagement with the mounting 20, as shown more clearly in Figure 3.

The projecting lens 22 and its mounting, together with the connections between the tubular head 7' and spindle 1, are quite similar to that set forth in my patent hereinbefore referred to in that the head is adjustable axially of and upon the spindle 1 to vary the distance of the projecting lens 22 from the lamp 10 and condenser lens 13 as may be required to produce the desired focus of the rays of light upon the eye under examination.

The tubular ferrule 11, although similar to that set forth in my Patent No. 1,981,214, above referred to, differs therefrom in that it is provided with a plurality of, in this instance four, radial openings 25 arranged in uniformly spaced relation circumferentially around the source of light or lamp 10, said radial openings being arranged in lengthwise alinement with the peripheral grooves 17 to allow rays of light from the lamp to pass through the rear opening when the head 7' is adjusted rotarily to different positions to register one or the other of the grooves 17 with the clamping screw 18.

That is, the tubular head 7' and parts carried thereby are not only adjustable axially but also rotarily upon the lamp-supporting spindle 1 for convenience in directing the rays of light from the projecting lens to the object under examination.

For example, when the tubular head 7' is moved downwardly to bring the clamping screw 18 into registration with the groove 16 in the spindle 1, the head and parts carried thereby may be rotated about the axis of the spindle. On the other hand, when it is desired to move the head 7' outwardly a limited distance, the screw 18 will be registered with one or the other of the lengthwise grooves 17, thus preventing the angular movement of the head through engagement of the screw with the opposite walls of the groove while the upper end of the groove serves as a stop to prevent accidental displacement of the head from the spindle 1.

When the head is adjusted to the desired position lengthwise of the spindle 1, it may be held in that position by simply tightening the set screw 18.

The rear side of the upper portion of the tubular head 7' is flattened to receive the adjacent portion of the flat plate 5 which is removably secured to the head 7' by screws 26, as shown by dotted lines in Figure 3, the lower end of the plate being engaged with a horizontal shoulder 27 on the rear side of the head 7 to assist in holding the plate 5 in operative position on said head.

This plate 5 extends some distance above the upper ends of the head 7' and projecting lens 22 and is provided with a relatively small sight opening 28 in a horizontal plane just above the upper end of the projecting lens 22 and closely adjacent thereto, as shown more clearly in Figure 3.

The back of the tubular head 7' and plate 5 are provided with registering apertures or slots 29 in horizontal alinement with the radial openings 25 in the ferrule 11 and, therefore, in alinement with the source of light to allow the light rays from the lamp to pass therethrough, said slots or apertures 29 being elongated vertically to compensate for vertical adjustment of the head 7' upon the spindle 1 in the manner previously described without cutting off the rays of light from the lamp through the openings 25.

The boss or journal bearing 3 is riveted or otherwise rigidly secured to the plate 5 to form a unitary part thereof and to project rearwardly therefrom for receiving and supporting the lens carrier 4 and the shutter plate 6, said carrier and shutter plate being held against rearward displacement from the bearing 3 by means of a clamping screw 30, Figure 3.

A suitable spacing washer 31 is interposed between the plate 5 and carrier 4 around the bearing 3 to reduce friction between the rotary carrier and plate 5.

The rotary carrier 4 is circular and of greater radius than the distance between the axis of the bearing 3 and sight opening 28 and preferably comprises a circular metal disc 32 and a circular dial plate 33, said disk and dial plate being of approximately the same diameter and both rotatably mounted upon the bearing 3 co-axial therewith.

The disc 32 is located directly at the rear of the relatively stationary plate 5 while the dial plate 33 is secured to the rear face of the disc by means of one or more clamping screws 34 to cause the disc and dial plate to rotate in unison.

The disc 32 and dial plate 33 are each provided with a multiplicity of relatively small apertures 35 and 35' arranged in uniformly spaced relation circumferentially around the axis of the carrier a distance corresponding to the distance between said axis and the sight opening 28 in the plate 5, the apertures 35 and 35' being arranged to register with each other to form continuous sight openings adapted to be brought into registration with the sight opening 28 as the carrier is rotated.

The apertures 35 in the disc 32 are provided with lenses 36 of different magnifying powers adapted to be brought into registration with the sight opening 28 one at a time through the rotation of the carrier for magnifying the object under examination under the reflected or refracted light produced by the projecting lens 22.

The shutter plate 6 is mainly circular and of sufficient area to extend across the rear face of the dial plate 33 closely adjacent thereto and has its lower and upper ends offset at 37 and 37' across the adjacent peripheral edges of the lens disc 32 and dial plate 33 leaving the opposite side edges of said disc and dial plate exposed to be engaged by the fingers of the hand for rotating the carrier.

The lower inwardly projecting flange 37 of the shutter plate 6 is provided with a notch 38 registering with a pin 39 on the stationary plate 5 to hold the shutter plate against angular movement about the axis of the lens carrier.

The front face of the disc 32 is provided with a multiplicity of notches, one for each lens, arranged in uniformly spaced relation circumferentially around the axis of the carrier and adapted to be engaged by a flat spring 40 which is secured at one end to the front face of the stationary plate 5 and has its other end extended through an opening 41 in said plate for engagement in any one of the registering notches to frictionally hold the carrier in its adjusted position with one or the other of its lenses in registration with the sight openings 35 or 35'.

The shutter plate 6 is provided with a sight opening 28' registering with the sight openings 35 and 35' to form a continuation thereof whereby the object under examination may be viewed through the registering lens of the carrier 4, while the remaining lenses will be obscured from view by the shutter plate.

The rear face of the dial plate 33 is provided with a multiplicity of different index characters 43, one for each of the lenses 36 and each designating the power of its particular lens, said indexes being arranged in uniformly spaced relation circumferentially around the axis of the carrier a distance somewhat less than the distance between said axis and the lenses 36 and in radial alinement with their corresponding lenses.

The shutter plate 6 is provided with a sight opening 44 a distance from the axis of the carrier corresponding to the radial distance of the index characters 43 from said axis and preferably diametrically opposite the sight opening 28', as shown more clearly in Figures 1 and 3 so that when the lens carrier is rotated about its axis to bring any one of the lenses 36 into registration with the sight openings 35, 35' and 28', the corresponding index character 43 will be registered with the sight opening 44 in the shutter plate.

Suitable means is provided whereby the rays of light from the lamp 10 may be transmitted or directed to the index characters 43 on the dial plate 33 and for this purpose, as shown in Figures 1 to 7 inclusive, the dial plate is preferably made of transparent or translucent material capable of allowing rays of light to pass therethrough for increasing the visibility of the index character through the sight opening 44.

In order that the rays of light from the lamp 10 may pass through the portion of the dial plate registering with the sight opening 44, the disc 32 is provided with a multiplicity of holes 45, one for each of the index characters 43, arranged in uniformly spaced relation circumferentially around the axis of the carrier a distance from said axis corresponding to the distance of the sight opening 44 from the same axis and preferably in radial alinement with their respective lenses at the upper sides thereof, as shown more clearly in Figures 3, 4 and 6, the inner or front ends of the holes 45 being slightly enlarged by inwardly projecting radial grooves 46 to facilitate the direction of the rays of light from the lamp through said holes.

It will be noted upon reference to Figure 3 that as each of the holes 45 is brought into registration with the sight opening 44 through the rotation of the carrier 4, it will also be brought into registration with the vertically elongated slot 29 in the adjacent sides of the head 7' and plate 5, thus permitting the rays of light to pass through the holes in different positions of axial adjustment of the head 7' upon the spindle 1.

In order to assure the registration of one or the other of the openings 25 in the ferrule 11 with the aperture 29, the lower end of the furrule is provided with a vertical slot 47 adapted to receive a projection 48 on the upper end of the spindle 1 just at the outside of the lamp, as shown more clearly in Figure 7.

In Figures 8 and 9 of the drawing is shown a modified means for illuminating the index characters on the dial plate in which the dial plate as 33' is provided with a multiplicity of relatively small holes 45', one for each of the holes 45 registered therewith, the portion of the shutter plate 10 as 6' adjacent the holes 45 and 45' being embossed rearwardly at 49, Figures 8 and 9, to form a reflector, said boss having an opening 44' in its lower side a distance from the axis of the carrier corresponding to the radial distance of the index characters 43 so that when any one of the index characters 43 is registered with said opening 44', the light rays from the lamp 10 passing through the holes 45 and 45' will be reflected downwardly by the reflector 49 onto the registering character 43 to render the latter visible through the sight opening 44'.

*Operation*

In the construction shown in Figures 1 to 6 inclusive, which is quite similar to that shown in my Patent No. 1,981,214 previously referred to, the tubular head 7' with the projecting lens 22, plate 5, and carrier 4 mounted thereon are placed in operative position upon the supporting spindle 1 and adjusted axially or rotarily on said spindle and locked in its adjusted position by the clamping screw 18 to properly focus the projecting lens 22 relatively to the lamp 10 and condenser lens 13 and upon the object under examination.

The lens carrier 4 is then adjusted rotarily upon its bearing 3 to bring the desired lens 36 and corresponding openings 35 and 35' into registration with the sight openings 28 and 28' in the plates 5 and 6 respectively at which time the corresponding index character 43 and adjacent hole 45 will be brought into registration with the sight opening 44 and apertures 29 in the head 7' and shutter plate 6 respectively.

Under these conditions, the rays of light from the lamp 10 will pass through the apertures 29 and registering hole 45, thereby illuminating the adjacent portion of the dial plate 33 to enable the registering index thereon to be readily visible through the sight opening 44, thus accomplishing the main object of the invention.

In like manner, through the same adjustments of the movable parts shown in Figures 8 and 9, the light rays from the lamp 10 will pass through the rear aperture 25 of the tubular shell 11 and thence through the registering aperture 29 in the plate 5 and registering holes 45 and 45' to be reflected downwardly by the reflector 49 onto the registering index 43 where it is readily visible through the sight opening.

In both forms of my invention, the rotary carrier 4 may be adjusted rotarily to bring any one of the lenses into registration with the sight openings 28 and 28' with the assurance that the corresponding index character 43 will be registered with the sight opening 44, Figure 3, or with the aperture 45', Figures 8 and 9, so that the character registering with the sight opening 44, Figure 3, or 44', Figure 9, may be readily visible through said opening without the aid of extra illuminating means, it being understood that in both forms the illumination of the index characters 43 is produced by the lamp.

Although I have shown and described specific means for illuminating the index characters corresponding to certain lenses as the latter are adjusted for use, it is evident that other means of illumination of these characters may be provided without departing from the spirit of the invention.

What I claim is:

1. In an ophthalmoscope, a frame, a rotary carrier having a series of different lenses and a corresponding number of lens-designating characters, one for each lens, said lenses and characters being arranged about the axis of the carrier, said frame having openings at diametrically opposite sides of said axis, each lens and its corresponding character being adapted to register respectively with said openings as the carrier is rotated, in combination with a source of light connected with the frame, and said carrier having means to transmit the rays of light through the opening with which the characters register to illuminate the registering character.

2. In an ophthalmoscope of the character described, a frame having a slotted aperture, a source of light arranged to project its rays through said aperture, a rotary disk having a series of holes arranged about its axis and each adapted to register with said aperture as the disk is rotated, and a dial of light-transmitting material rotatable with said disk and provided with different indices each registered with one of the holes to receive the light rays when registered with said aperture, said aperture being radial to the axis of the carrier and in a direct line between the source of light and registering hole in the carrier to allow the light rays to pass directly to the registering index.

3. In an ophthalmoscope, a frame, a rotary carrier having a series of different lenses and a corresponding number of different lens-indicating characters, one for each lens, said lenses and characters being arranged about the axis of the carrier, said frame having openings at diametrically opposite sides of said axis, each lens and its corresponding character being adapted to register respectively with said openings as the carrier is rotated, in combination with a source of light arranged within the frame, and means for directing rays of light from said source through one of said openings to the registering character.

4. In an optical instrument, the combination with a rotary carrier having a series of lenses and a corresponding number of indexes, one for each lens, said indexes being disposed on the side of the carrier next to the observer when in use, each lens and its index being adapted to be simultaneously presented to different predetermined positions as the carrier is rotated, a source of light mounted on the instrument, and means including a reflector on the instrument adjacent the index when the latter is brought to its predetermined position for directing rays of light from said source to said index, whereby the latter may be viewed from the observer's side.

5. In an ophthalmoscope instrument, a rotary carrier having a sight-opening and a light-opening at diametrically opposite sides of the axis of the carrier, a lens in the sight-opening, a lens-index on the carrier adjacent the light-opening, a source of light on the instrument arranged to direct its rays through the light-opening, and means including a reflector on the instrument for directing the rays passing through said light-opening to the index for illuminating the latter.

6. In an ophthalmoscope instrument, a rotary carrier having a sight-opening and a light-opening at diametrically opposite sides of the axis of the carrier, a lens in the sight-opening, a lens-index on the carrier adjacent the light-opening, a source of light on the instrument at one side of the carrier arranged to direct its rays through the light-opening, and a reflector on the instrument at the opposite side of the carrier for directing said rays to the index for illuminating said index.

7. In an optical instrument, a rotary carrier having lenses and indexes therefor both arranged about the axis of the carrier the index for a predetermined lens being arranged on the carrier on the side of the axis opposite said lens and on the side of the observer when in use, a source of light mounted on the instrument, and means including a reflector on the instrument for directing rays of light from said source to each index when the latter is brought to a predetermined position by the rotation of said carrier.

8. In an ophthalmoscope, the combination of a frame having a sight opening therein through which the observer may view the subject of examination, a source of light associated with said frame for directing light rays upon said subject, a lens carrier mounted on the frame and having a series of lenses arranged to traverse the sight opening and a series of indexes corresponding to said lenses arranged on the side of the carrier next the observer, whereby reading of the index from the observer's side may be accomplished without movement of the instrument, and means for directing light rays from the said light source onto each index as the corresponding lens is presented at the sight opening.

9. In an ophthalmoscope of the character described, a frame, a movable carrier having a multiplicity of lenses and including a translucent member having a corresponding number of different lens designating characters, one for each lens, and a source of light to illuminate the eye of the subject and arranged to project its rays through the translucent member to illuminate the lens designating character when the carrier is adjusted for rendering operative the associated lens designated by such character.

10. An ophthalmoscope of the construction claimed in claim 9 in which the lens designating characters are disposed upon the lens carrier and intermediate the source of light and the observer's side of the instrument so that when illuminated they are rendered visible from the observer's side of the ophthalmoscope.

WILLIAM N. ALLYN.